United States Patent
Lee et al.

(10) Patent No.: US 10,886,510 B2
(45) Date of Patent: Jan. 5, 2021

(54) BATTERY MODULE WITH SELECTIVE TEMPERATURE CONTROL

(71) Applicant: SK Innovation Co., Ltd., Seoul (KR)

(72) Inventors: Tae Gu Lee, Daejeon (KR); Ji Hoon Lim, Daejeon (KR); Kyoung Min Cho, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 149 days.

(21) Appl. No.: 15/249,171

(22) Filed: Aug. 26, 2016

(65) Prior Publication Data

US 2017/0069887 A1   Mar. 9, 2017

(30) Foreign Application Priority Data

Sep. 9, 2015   (KR) .................. 10-2015-0127366

(51) Int. Cl.
| | |
|---|---|
| *H01M 10/60* | (2014.01) |
| *H01M 2/10* | (2006.01) |
| *H01M 10/615* | (2014.01) |
| *H01M 10/613* | (2014.01) |
| *H01M 10/655* | (2014.01) |
| *H01M 10/625* | (2014.01) |
| *H01M 10/6555* | (2014.01) |
| *H01M 10/647* | (2014.01) |
| *H01M 10/6556* | (2014.01) |

(52) U.S. Cl.
CPC ....... *H01M 2/1077* (2013.01); *H01M 10/613* (2015.04); *H01M 10/615* (2015.04); *H01M 10/625* (2015.04); *H01M 10/647* (2015.04); *H01M 10/655* (2015.04); *H01M 10/6555* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2012/0263984 A1 | 10/2012 | Krammer | |
| 2015/0037649 A1* | 2/2015 | Wyatt | H01M 10/625 |
| | | | 429/120 |
| 2015/0079443 A1 | 3/2015 | Buck et al. | |
| 2016/0133898 A1* | 5/2016 | Choi | H01M 10/0525 |
| | | | 429/151 |

FOREIGN PATENT DOCUMENTS

| | | |
|---|---|---|
| CN | 101855775 A | 10/2010 |
| CN | 104518185 A | 4/2015 |

(Continued)

OTHER PUBLICATIONS

Search Report issued by the European Patent Office dated Feb. 10, 2017.

(Continued)

*Primary Examiner* — Lucas J. O'Donnell
(74) *Attorney, Agent, or Firm* — IP & T Group LLP

(57) ABSTRACT

A battery module may include a plurality of sub-modules arranged in a single direction, a cooling unit contacting one sides of the plurality of sub-modules to cool the plurality of sub-modules, and a heating unit contacting other sides opposing the one sides of the plurality of sub-modules to heat the plurality of sub-modules.

9 Claims, 6 Drawing Sheets

(56) References Cited

FOREIGN PATENT DOCUMENTS

| CN | 204464348 | 7/2015 |
|---|---|---|
| DE | 102012101141 | 8/2013 |
| FR | 2 988 918 | 10/2013 |
| JP | 2008-035581 | 2/2008 |
| JP | 2013-242979 A | 12/2013 |
| KR | 1020140007080 | 1/2014 |
| KR | 10-2014-0047306 A | 4/2014 |
| KR | 1020140089456 | 7/2014 |
| KR | 1020150036897 | 4/2015 |

OTHER PUBLICATIONS

Office Action issued by the European Intellectual Property Office dated Aug. 13, 2018.
Office Action issued by China Intellectual Property Office dated Aug. 27, 2020.

* cited by examiner

BATTERY MODULE WITH SELECTIVE TEMPERATURE CONTROL

CROSS-REFERENCE TO RELATED APPLICATION

This application claims benefit of priority to Korean Patent Application No. 10-2015-0127366 filed on Sep. 9, 2015 in the Korean Intellectual Property Office, the disclosure of which is incorporated herein by reference in its entirety.

BACKGROUND

1. Field

The present disclosure relates to a battery module.

2. Description of Related Art

Recently, high-output battery modules using a non-aqueous electrolyte solution having a high-energy density have been developed. Such high-output battery modules have been implemented to have high levels of capacity by connecting a plurality of battery cells to each other in series or parallel to be used as a power source for a device that requires high power, such as an electric or hybrid vehicle.

The efficiency and performance of the battery modules depend on temperatures thereof. Fox example, when a battery module is discharged at high temperatures, the lifespan thereof is significantly reduced. Further, the charging and discharging performance of a battery module are reduced at low temperatures until the temperature of the battery module reaches a required temperature.

SUMMARY

An aspect of the present disclosure may provide a method of maintaining a battery module at an appropriate temperature by selectively cooling or heating the battery module, if necessary.

According to an aspect of the present disclosure, a battery module may include: a plurality of sub-modules arranged in a single direction; a cooling unit contacting one sides of the plurality of sub-modules to cool the plurality of sub-modules; and a heating unit contacting other aides opposing the one sides of the plurality of sub-modules to heat the plurality of sub-modules.

Each of the plurality of sub-modules may include a pair of battery cells, a heat transfer member interposed between the pair of battery cells, a frame member supporting the pair of battery cells and the heat transfer member, and a pair of pad members fastened to the frame member to cover the pair of battery cells.

The heat transfer member may include a body disposed in the center of the frame member, and flanges respectively connected to both ends of the body to be respectively exposed to upper and lower surfaces of the frame member.

The heat transfer member may have an I-beam structure formed by connecting central portions of surfaces of the flanges opposing each other to both ends of the body in a substantially vertical manner.

The frame member may have a ring shape including a pair of lateral surfaces respectively connecting both ends of each of the upper and lower surfaces to each other, and the body of the heat transfer member may extend across a space between the upper and lower surfaces in the center of the frame member.

Each of the flanges may have a protrusion protruding from a surface and a receiving groove recessed in another surface, and the protrusion and the receiving groove may have shapes allowing for engagement with each other.

The protrusion and the receiving groove may extend in a length direction of each of the flanges.

Each of the flanges may have fastening grooves recessed in a surface connected to the body.

The fastening grooves may be symmetrical to each other based on the body, and may extend in a length direction of each of the flanges.

The battery module may further include a housing supporting the plurality of sub-modules, the cooling unit, and the heating unit.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
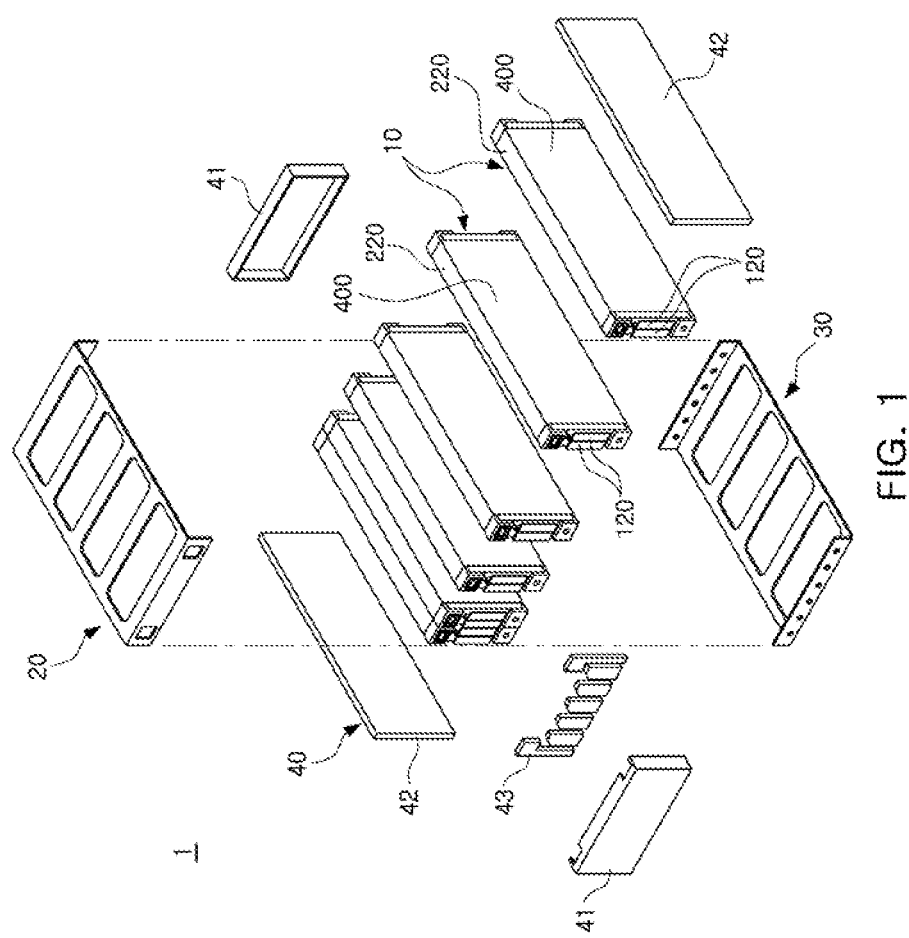
FIG. 1 is a schematic exploded perspective view illustrating a battery module according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element, is referred to as being "directly on," "directly connected to," or "directly coupled to" another element, there may foe no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may foe used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may fee otherwise oriented (rotated 90 degrees or at other orientations) and the spatially relative descriptors used herein may be interpreted accordingly.

The terminology used, herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, and may include changes in shapes resulting from manufacturing errors. The following embodiments may also be constituted by one or a combination thereof.

The contents of the present disclosure described below may have a variety of configurations and only a required configuration is proposed herein, but the present disclosure is not limited thereto.

Figure 2:
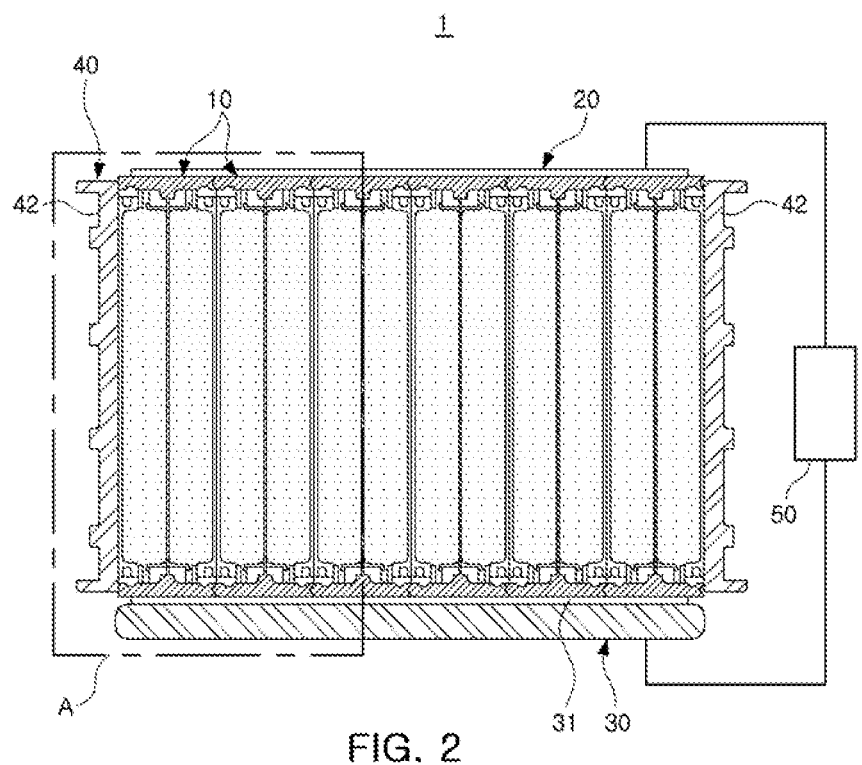
FIG. 2 is a schematic cross-sectional view illustrating the battery module illustrated in FIG. 1.
Figure 3:
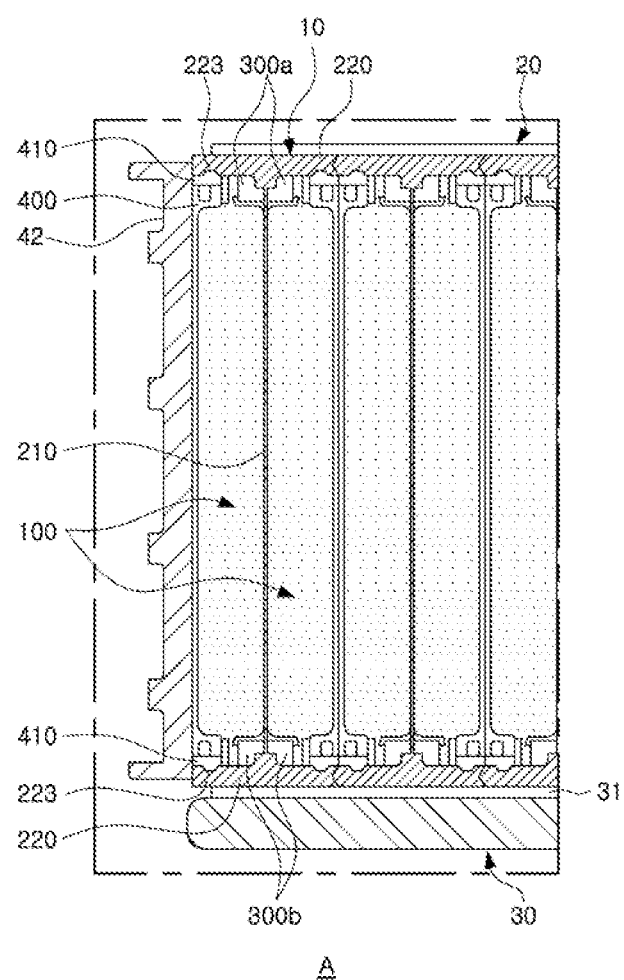
FIG. 3 is an enlarged cross-sectional view illustrating region A of the battery module illustrated in FIG. 2.

Referring to FIGS. 1 through 3, a battery module according to an exemplary embodiment in the present disclosure will be described. FIG. 1 is a schematic exploded perspective view illustrating a battery module according to an exemplary embodiment in the present disclosure; FIG. 2 is a schematic cross-sectional view illustrating the battery module illustrated in FIG. 1; and FIG. 3 is an enlarged view illustrating region A of the battery module illustrated in FIG. 2.

Referring to FIGS. 1 through 3, a battery module 1 according to an exemplary embodiment in the present disclosure may include a plurality of sub-modules 10, a cooling unit 20, and a heating unit 30. The battery module 1 may further include a housing 40 supporting the plurality of sub-modules 10, the cooling unit 20, and the heating unit 30.

Each of the plurality of sub-modules 10 may have substantially hexahedral structure, and may be arranged in a single direction. Each sub-module 10 may include a secondary lithium battery or a secondary nickel-hydride battery that may be charged or discharged.

Figure 4:
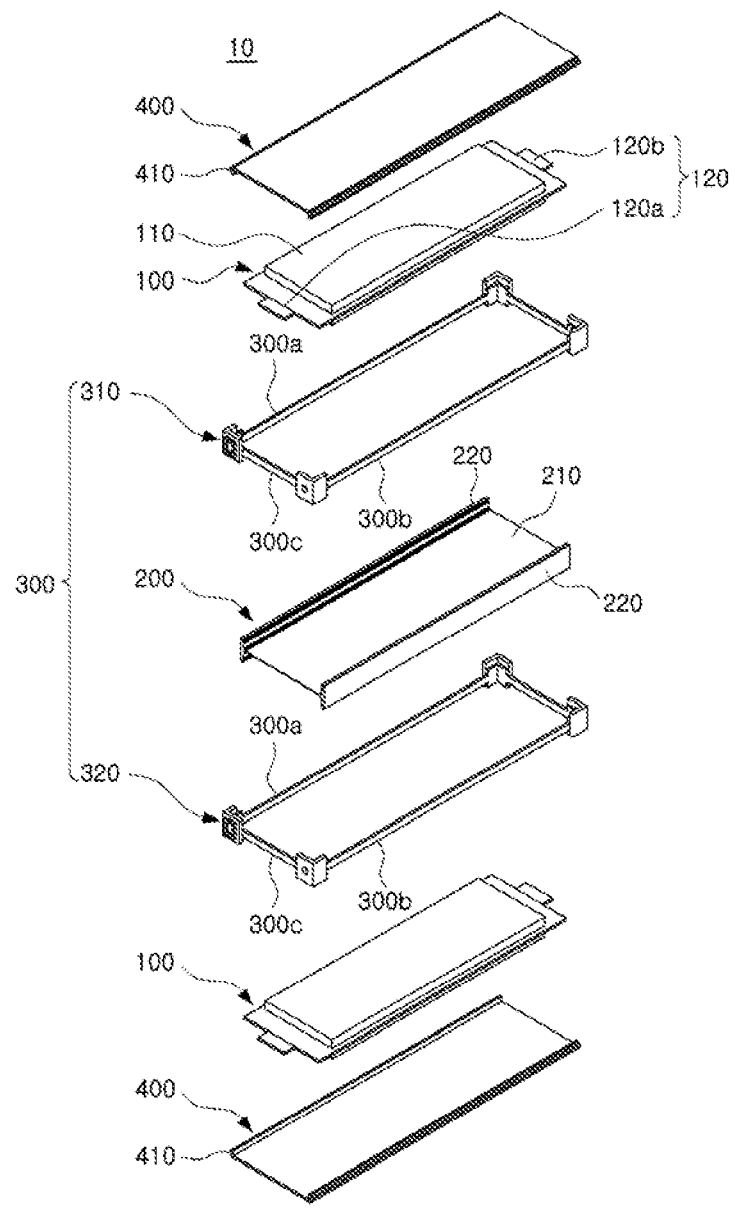
FIG. 4 is a schematic exploded perspective view illustrating a sub-module of the battery module according to the exemplary embodiment in the present disclosure.
Figure 5:
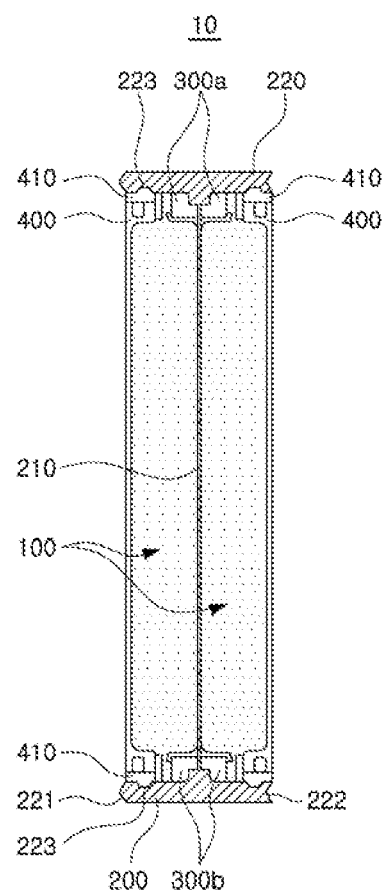
FIG. 5 is a schematic cross-sectional view illustrating the sub-module: illustrated in FIG. 4.

FIGS. 4 and 5 schematically illustrate the sub-module 10. FIG. 4 is a schematic exploded perspective view illustrating the sub-module 10, and FIG. 5 is a cross-sectional view of the sub-module 10.

Referring to FIGS. 4 and 5, the sub-module 10 may include a pair of battery cells 100, a neat transfer member 200 inter posed between the pair of battery cells 100, a frame member 300 supporting the pair of battery cells 100 and the heat transfer member 200, and a pair of pad members 400 fastened to the frame member 300 to cover the pair of battery cells 100.

Each of the battery cells 100 may include a battery case 110 and an electrode tab 120 externally extending from the battery case 110 for connection of a power source. The electrode tab 120 may be connected to an electrode assembly (not illustrated) disposed inside the battery case 110.

Each of the battery cells 100 may have, for example, a pouch structure, but is not limited, thereto. For example, each of the battery cells 100 may also have a quadrangle structure. The exemplary embodiment describes each of the battery cells 100 having a pouch structure.

The battery case 110 may be formed by processing a surface of a metal layer including, for example, aluminum (Al) to be insulated. For the insulation processing, a modified polypropylene, that is, a polymer resin, for example, cast polypropylene (CPP), may be coated to form a thermal bonding layer, and a resin material such as a nylon or a polyethylene terephthalate (PET) may be formed on an outer surface of the modified polypropylene.

The electrode tab 120 may include an anode tab 120a and a cathode tab 120b The anode tab 120a and the cathode tab 120b may have a structure in which the anode tab 120a and the cathode tab 120b may protrude to both lateral surfaces of the battery case 110 opposing each other, respectively, to extend in different directions.

The anode tab 120a and the cathode tab 120b may be formed of a thin plate-like metal. For example, the anode tab 120a may be formed of an aluminum (Al) material, and the cathode tab 120b may be formed of a copper (Cu) material.

The heat transfer member 200 may contact the battery cells 100 disposed on both sides thereof in a space between the battery cells 100.

The heat transfer member 200 may have a quadrangular plate structure, and may include a body 210 disposed in the center of the frame member 300, and a pair of flanges 220 respectively connected to both ends of the body 210 to be respectively exposed to upper surfaces 300a and lower surfaces 300b of the frame member 300.

Figure 6A:
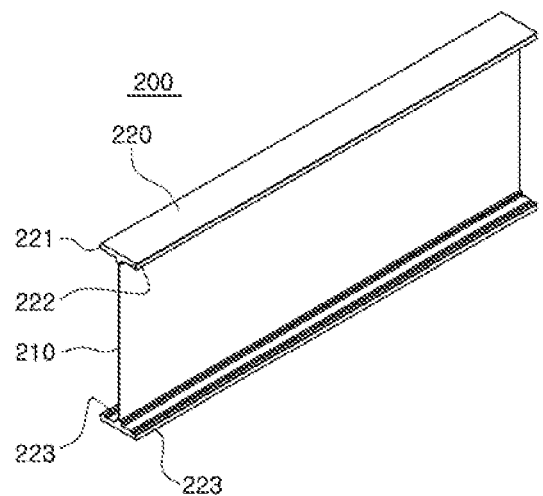
FIG. 6A is a schematic perspective view illustrating a heat transfer member included in the sub-module according to the exemplary embodiment in the present disclosure.
Figure 6B:
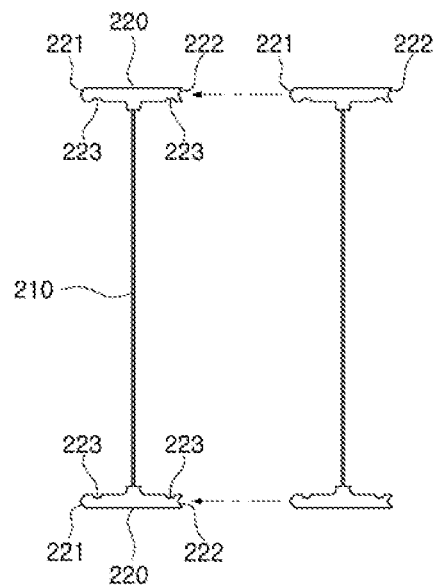
FIG. 6B is a schematic cross-sectional view illustrating the heat transfer member included in the sub-module according to the exemplary embodiment.

FIGS. 6A and 6B schematically illustrate the heat transfer member 200. FIG. 6A is a schematic perspective view of the heat transfer member 200. FIG. 6B is a schematic cross-sectional view of the heat transfer member 200.

Referring to FIGS. 6A and 6B, the heat transfer member 200 may have a structure in which the body 210 may connect a pair of flanges 220, parallel to each other, to each other. For example, the heat transfer member 200 may have a substantially I-beam structure formed by connecting central portions of surfaces of the flanges 220 opposing each other to both ends of the body 210 in a substantially vertical manner.

Each of the flanges 220 may have a protrusion 221 protruding from a surface, and a receiving groove 222 recessed in another surface opposing the surface. The protrusion 221 and the receiving groove 222 may have shapes allowing for engagement with each other. Here, the surface and the other surface of the flange 220 may correspond to, for example, both surfaces parallel to a length direction of the flange 220 having a rectangular shape. Thus, the protrusion 221 and the receiving groove 222 may extend to be parallel to each other in the length direction of the flange 220.

Referring to FIGS. 3 and 6B, the flange 220 may have a structure in which the flange 220 may sequentially engage with another flange 220 of another sub-module 10 adjacent to the sub-module 10. In detail, any one flange 220 may be fastened to another such that the protrusion 221 may engage with another receiving groove 222 of another flange 220 adjacent to the flange 220. In such a manner, the plurality of sub-modules 10 may have a structure in which the respective flanges 220 may be sequentially connected to each other.

The flange 220 may have fastening grooves 223 recessed to a certain depth in the surface of the flange 220 connected to the body 210. The fastening grooves 223 may be symmetrical of the flange 220. The fastening groove 223 may extend in the length direction of the flange 220.

The heat transfer member 200 may be formed of a material having high thermal conductivity, for example, a metal material. The material, of the heat transfer member 200 is not, however, limited thereto.

The frame member 300 may include a first frame 310 and a second frame 320, and may have a structure in which the first frame 310 and the second frame 320 may be attached to both sides of the heat transfer member 200 with the heat transfer member 200 interposed therebetween.

The frame member 300 may include a pair of lateral surfaces 300c respectively connecting both ends of each of the upper surfaces 300a to those of each of the lower surfaces 300b to have a hollow quadrangular ring shape. For example, the frame member 300 may be configured to include four surfaces surrounding the outer peripheral portion of each of the battery cells 100.

The frame member 300 may have the body 210 of the heat transfer member 200 disposed in the center thereof to extend across a space between the upper surfaces 300a and the lower surfaces 300b. The upper and lower surfaces 300a and 300b of the frame member 300 may have the flanges 220 respectively disposed thereon to be exposed externally from the upper and lower surfaces 300a and 300b.

The pair of the pad members 400 may be respectively fastened to both sides of the frame member 300 to cover the battery cells 100.

The pad member 400 may come in surface contact with the battery cell 100 to uniformly distribute external pressure to the surface of the battery cell 100. For example, the pad member 400 may function as a buffer member that may protect the battery cell 100 and reduce an external impact thereon.

The pad member 400 may have stop protrusions 410 formed on both ends thereof contacting the flanges 220. The stop protrusion 410 may extend in the length direction of the pad member 400.

Referring to FIG. 5, the stop protrusions 410 may be inserted into the fastening grooves 223 of the flanges 220, respectively, when fastened to the frame member 300.

The pair of pad members 400 may be formed of a robust material to protect the pair of battery cells 100 disposed on the inside of the pad members 400.

Referring again to FIGS. 1 and 2, the cooling unit 20 and the heating unit 30 may nave a structure in which the cooling unit 20 and the heating unit 30 may oppose each other with the plurality of sub-modules 10 interposed therebetween.

The cooling unit 20 may contact one sides of the plurality of sub-modules 10, for example, upper sides, to cool the plurality of sub-modules 10.

As illustrated in the drawings, the cooling unit 20 may contact a portion of the flanges 220 upwardly exposed from the plurality of sub-modules 10 while the plurality of sub-modules 10 are arranged.

The cooling unit 20 may include, for example, an indirect cooling device that may cool the plurality of sub-modules 10 through a circulating refrigerant. For example, water, air, Freon, ammonia, a sulfur dioxide, or a methyl chloride may be used as a refrigerant.

The cooling unit 20 and the plurality of sub-modules 10 may have a further heat sink pad (not illustrated) interposed therebetween, if necessary.

The heating unit 30 may contact other sides, for example, lower sides, opposing the one sides of the plurality of sub-modules 10 to heat the plurality of sub-modules 10.

As illustrated in the drawings, the heating unit 30 may contact portions of the flanges 220 downwardly exposed from the plurality of sub-modules 10 while the plurality of sub-modules 10 are arranged.

The heating unit 30 may include, for example, a heater jacket having an internal heating coil.

The heating unit 30 and the plurality of sub-modules 10 may have a thermal conductivity pad 31 interposed therebetween for a uniform distribution of heat. The thermal conductivity pad 31 may be selectively interposed therebetween, and may also be removed according to an exemplary embodiment.

The cooling unit 20 and the heating unit 30 may be connected to a control unit 50 to selectively operate, if necessary. For example, an operator may selectively operate any one of the cooling unit 20 and the heating unit 30 through the control unit 50 to cool or heat the plurality of sub-modules 10.

For example, when low temperatures in wintertime cause a temperature of the battery module 1 to be decreased below an appropriate temperature, the operator may drive the heating unit 30 to heat the plurality of sub-modules 10, raising the temperature of the battery module 1 to the appropriate temperature. Further, when high temperatures in summertime cause the temperature of the battery module 1 to be excessively high, the operator may drive the cooling unit 20 to cool the plurality of sub-modules 10, lowering the temperature of the battery module 1 to the appropriate temperature.

The housing 40 may support the plurality of sub-modules 10, the cooling unit 20, and the heating unit 30, The housing 40 may include a pair of end plates 41 and a pair of covers 42.

The pair of end plates 41 may be respectively disposed on both ends of the plurality of sub-modules 10, arranged in a single direction, that is, a width direction. The pair of covers 42 may be respectively disposed on both ends of the plurality of sub-modules 10 in a length direction of the sub-modules 10, Thus, the plurality of sub-modules 10 may be surrounded by the pair of end plates 41 and the pair of covers 42 to be supported thereby.

The plurality of sub-modules 10 may be electrically connected to each other through a bus bar 43. The bus bar 43 may be interposed between the plurality of sub-modules 10 and the covers 42. The bus bar 43 may be connected to the electrode tabs 120 of the plurality of sub-modules 10.

As such, the battery module 1 according to the exemplary embodiment may have a structure in which both ends of the heat transfer member 200 having the I-beam shape and passing through the sub-modules 10 in a vertical direction may be connected to the cooling unit 20 and the heating unit 30, respectively. The battery module 1 may thus be cooled or heated through selective driving of the cooling unit 20 or the heating unit 30.

As set forth above, according to exemplary embodiments in the present disclosure, a battery module that may maintain an appropriate temperature thereof through selective cooling or heating of the battery module, if necessary, may be provided.

While embodiments nave been shown and described above, it will be apparent to those skilled in the art that modifications and variations could be made without departing from, the scope of the present disclosure as defined by the appended claims.

What is claimed is:

1. A battery module comprising:
   a plurality of sub-modules arranged in a direction, each of the plurality of sub-modules including at least one pair of battery cells, a heat transfer member interposed between the battery cells, a frame member supporting the battery cells and the heat transfer member and a pair of pad members fastened to the frame member to cover the battery cells;
   a cooling unit contacting one side of the plurality of sub-modules to cool the plurality of sub-modules;
   a heating unit contacting another side of the plurality of sub-modules to heat the plurality of sub-modules; and
   a housing supporting the plurality of sub-modules, the cooling unit, and the heating unit,
   wherein the heat transfer member includes a body disposed in the center of the frame member, and flanges respectively connected to both ends of the body to be respectively exposed to upper and lower surfaces of the frame member,
   wherein the cooling unit contacts a portion of the flanges upwardly exposed from the plurality of sub-modules arranged in the battery module,
   wherein the heating unit contacts portions of the flanges downwardly exposed from the plurality of sub-modules arranged in the battery module,
   wherein each pad member has stop protrusions formed on both ends thereof contacting the flanges, and
   wherein the stop protrusions are inserted into fastening grooves of the flanges.

2. The battery module of claim 1, wherein the heat transfer member has an I-beam structure formed by connecting central portions of surfaces of the flanges opposing each other to both ends of the body in a substantially vertical manner.

3. The battery module of claim 1, wherein the body of the heat transfer member extends across a space between the upper and lower surfaces in the center of the frame member.

4. The battery module of claim 1, wherein each of the flanges further has fastening grooves recessed in a surface connected to the body.

5. The battery module of claim 4, wherein the fastening grooves are symmetrical to each other based on the body, and extend in a length direction of each of the flanges.

6. The battery module of claim 1, wherein the frame member includes an upper surface, a lower surface and a pair of lateral surfaces respectively connecting both ends of the upper surface to those of the lower surface to have a quadrangular ring shape structure with a hollow center surrounding the outer peripheral portion of each of the battery cells.

7. The battery module of claim 1, wherein the housing includes a pair of covers,
   wherein the pair of covers are respectively disposed on both ends of the plurality of sub-modules in a length direction of the sub-modules.

8. The battery module of claim 1, wherein each of the flanges has a protrusion protruding from a surface and a receiving groove recessed in another surface, and the protrusion of a flange of a heat transfer member is configured to engage with the groove of another of the plurality of heat transfer members.

9. The battery module of claim 8, wherein the protrusion and the receiving groove extend in a length direction of each of the flanges.

* * * * *